United States Patent [19]

Yokoyama et al.

[11] Patent Number: 5,304,619

[45] Date of Patent: Apr. 19, 1994

[54] ETHYLENE POLYMERS OR COPOLYMERS HAVING IMPROVED INSULATING PROPERTIES, COMPOSITIONS, AND POWER CABLES MADE THEREFROM

[75] Inventors: Junichi Yokoyama, Yokohama; Hideo Kawabata, Kawasaki; Masaaki Ikeda, Tokyo; Katsufumi Suga; Masayoshi Kariya, both of Yokohama, all of Japan

[73] Assignee: Nippon Petrochemicals Co., Ltd., Japan

[21] Appl. No.: 709,887

[22] Filed: Jun. 4, 1991

[30] Foreign Application Priority Data

Jun. 4, 1990 [JP] Japan .................................. 2-145604

[51] Int. Cl.$^5$ ....................... C08F 20/42; C08F 20/44
[52] U.S. Cl. ............................... 526/311; 174/110 R; 174/110 PM; 526/297; 526/300; 526/310; 526/342; 526/316; 526/318.6; 526/348.8
[58] Field of Search ............... 526/311, 297, 342, 316, 526/310, 318.6; 174/110 R, 119 PM

[56] References Cited

U.S. PATENT DOCUMENTS

| | | | |
|---|---|---|---|
| 3,657,202 | 4/1972 | Hammer | 525/189 |
| 3,676,401 | 7/1972 | Henry | 428/913 |
| 3,862,056 | 1/1975 | Hartman | 524/504 |
| 4,520,230 | 5/1985 | Uesugi | 174/107 |
| 4,709,808 | 12/1987 | Balduff | 206/158 |
| 4,714,741 | 12/1987 | Balduff | 525/185 |
| 4,935,304 | 6/1990 | Danforth | 428/423.1 |

Primary Examiner—Fred Zitomer
Attorney, Agent, or Firm—Ostrolenk, Faber, Gerb & Soffen

[57] ABSTRACT

A polar group-containing ethylene polymer or copolymer having improved insulating properties, or a composition thereof is characterized in that said polar group-containing ethylene polymer or copolymer contains 20 to 8000 ppm of a polar group having a dipole moment of more than 0.8 debye. The polymer can be used in a power cable as insulation.

4 Claims, 1 Drawing Sheet

Content of Ketone group in an ethylene/methyl vinylketone copolymer of the present invention(ppm)

ETHYLENE POLYMERS OR COPOLYMERS HAVING IMPROVED INSULATING PROPERTIES, COMPOSITIONS, AND POWER CABLES MADE THEREFROM

BACKGROUND OF THE INVENTION

1. Field of the Invention

This invention relates to a polar group-containing ethylene polymer or copolymer having improved high-voltage insulating characteristics and improved moldability, and to a composition thereof. The invention also relates to a high-voltage cable made by utilization of said ethylene polymer or copolymer or said composition.

More particularly, the present invention relates to a polar group-containing polymer or copolymer having improved insulation resistance and good dielectric breakdown strength, a composition thereof, and a high-voltage power cable made from said polymer or copolymer or said composition.

2. Description of the Prior Art

Heretofore, high-pressure radical polymerization process polyethylene and crosslinked polyethylene are used widely as an insulating material for high-voltage cables because of their excellent electric characteristics.

Nevertheless, the need for continuing improvement in power loss during transmission indicates the need for still further technological progress in high-voltage cables.

One of the means for decreasing such power loss is to increase the insulation resistance of the insulating materials to be used for the production of high-voltage cables.

In recent years, the field of high-voltage cables wherein said cables are used is expanding into such regions where even higher-voltage insulating materials are required. In spite of this fact, the thickness of the insulating layer for high-voltage cables tends to be decreasing year by year because of increasing transportation and installation costs.

Therefore, there is a continuing and growing demand for improving electric properties such as dielectric breakdown strength of a high-voltage insulating layer for power cables to decrease the thickness of the insulating layer.

The present invention is based on a finding that a remarkable improvement of insulation resistance of an ethylene polymer or copolymer can be attained by incorporation of a specific polar group in a specific amount into said ethylene polymer or copolymer.

SUMMARY OF THE INVENTION

It is an object of the present invention to provide a polar group-containing ethylene polymer or copolymer having excellent insulation resistance and dielectric breakdown strength, and a composition thereof.

It is also an object of the present invention to provide a high-voltage cable made from said polymer or copolymer or said composition.

BRIEF DESCRIPTION OF THE DRAWINGS

1. stainless steel ball
2. specimen
3. epoxy adhesive
4. polymethyl methacrylate

DESCRIPTION OF THE PREFERRED EMBODIMENTS

Figure 1:
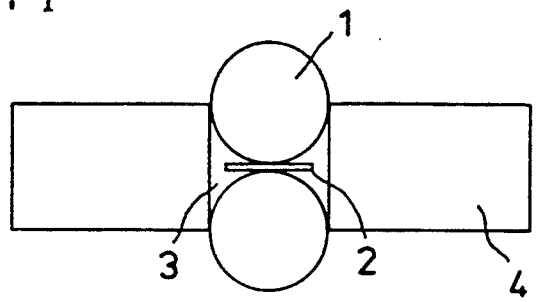
FIG. 1 shows a schematic side view showing a Mckeown electrode used for the test of impulse breakdown strength in the present invention in which the numerals represent.

According to the present invention there is an ethylene polymer or copolymer containing a polar group provided in an amount of 20 to 8000 ppm wherein said polar group has a dipole moment of more than 0.8 debye, and a composition thereof.

Further, according to the present invention there is provided a power cable made by utilization of said polar group-containing ethylene polymer or copolymer or said composition thereof.

In the present ethylene polymer or copolymer containing a polar group in an amount of 20 to 8000 ppm wherein said polar group has a dipole moment of more than 0.8 debye or in the composition thereof, the polar group is selected from the group consisting of ketone, nitrile, and nitro groups.

Ethylene polymers or copolymers according to this invention can be formed by a method such as copolymerization of ethylene with a comonomer having the above-mentioned polar group, graft polymerization of said comonomer on a conventional polyethylene, blending a polar group-containing ethylene polymer or copolymer with a conventional polyethylene, or oxidation of a conventional polyethylene.

Of these methods, the copolymerization of ethylene with a comonomer having the polar group, and the graft polymerization of said comonomer on a conventional polyethylene are most preferred from a viewpoint of homogeneousness of the polar group in the resultant polymer and of their modification effect on the properties of the conventional ethylene polymer or copolymer.

Examples of the polar monomer of the present invention include carbon monoxide, methyl isopropenyl ketone, methyl vinyl ketone, isopropenyl vinyl ketone, ethyl vinyl ketone, phenyl vinyl ketone, t-butyl vinyl ketone, isopropyl vinyl ketone, methyl propenyl ketone, cyclohexyl vinyl ketone, acrylonitrile, methacrylonitrile, α-methoxyacrylonitrile, vinylidene cyanide, cinnamonitrile, crotononitrile, α-phenylcrotononitrile, fumaronitrile, allylacetonitrile, 2-butenenitrile, 3-butenenitrile, 2,4-dinitrophenylacrylate, 2-nitrostyrene, m-nitrostyrene, o-nitrostyrene, p-nitrostyrene, p-nitrophenyl methacrylate, m-nitrophenyl methacrylate, 2,4-dinitrophenyl methacrylate, 2,4,6-trinitrophenyl methacrylate, and the like.

Examples of the polar group-containing copolymer of the present invention include an ethylene/carbon monoxide copolymer, ethylene/methyl vinyl ketone copolymer, ethylene/ethyl vinyl ketone copolymer, ethylene/acrylonitrile copolymer, ethylene/methacrylonitrile copolymer, ethylene/allylacetonitrile copolymer, ethylene/2-nitrostyrene copolymer, ethylene/m-nitrostyrene copolymer, ethylene/p-nitrophenyl methacrylate copolymer, and ethylene/methyl isopropenyl ketone copolymer, and the like.

When copolymering the aforesaid polar comonomer with ethylene, at least one of other unsaturated monomers may be further copolymerized, if necessary.

One of the preferred methods for preparing the present ethylene copolymers is a high-pressure radical polymerization process which is said to have no adverse effect on the electric properties of the resultant polyethylene and can produce a polyethylene without any metallic catalyst residues in the resulting polymer.

That is, the polar group-containing ethylene copolymer may be prepared by simultaneously or stepwise contacting and polymerizing a monomer mixture of 60 to 99.99 8% by weight of ethylene, 0.002 to 0.8% by weight of the polar group-containing aforesaid comonomer, and less than 39.2% by weight of at least one other olefinic monomer in the presence of 0.0001 to 1% by weight of a radical polymerization initiator based on the total weight of all the monomers at a polymerization pressure of 500 to 4,000 kg/cm$^2$, preferably 1,000 to 3,500 kg/cm$^2$, at a reaction temperature of 50° to 400° C., preferably 100° to 350° C. using a chain transfer agent and, if necessary, some auxiliaries in an autoclave or tubular reactor.

Examples of the above-mentioned radical polymerization initiator include conventional initiators such as peroxides, hydroperoxides, azo-compounds, amine oxide compounds and oxygen.

Examples of the above-mentioned chain transfer agent include hydrogen; propylene and butene-1; saturated aliphatic hydrocarbons having 1 to 20 or more carbon atoms such as methane, ethane, propane, butane, isobutane, n-hexane, n-heptane, cycloparaffin; and halogenated hydrocarbons such as chloroform and carbon tetrachloride; and aromatic compounds such as toluene, diethylbenzene, and xylene.

Examples of an other olefinic monomer include olefins such as propylene, butene-1, hexene-1, decene-1, octene-1, and styrene.

Another advantageous process for preparing the polar group-containing ethylene polymer or copolymer is a grafting technique wherein the polar group-containing comonomer is grafted on a conventional ethylene homopolymer or copolymer.

Examples of the conventional ethylene homopolymer or copolymer include a low-density or medium-density ethylene homopolymer, an ethylene/propylene copolymer, an ethylene/butene-1 copolymer, an ethylene/hexene-1 copolymer, an ethylene/4-methylpentene-1 copolymer, an ethylene/octene-1 copolymer, a copolymers of ethylene with an other α-olefin, and mixtures thereof.

As a grafting technique used for the production of the present polar group-containing ethylene copolymer, there may be use the well known process such as a chain transfer process and ionizing radiation process wherein graft polymerization may be carried out by the aid of a curing agent such as organic peroxides in the absence or presence of an inert solvent.

Examples of the polar group-containing ethylene polymer or copolymer composition of the present invention include a composition of ethylene homopolymer or copolymer blended with one of the aforesaid polar group-containing ethylene polymers or copolymers, or a composition of ethylene homopolymer or copolymer blended with a polar group-containing polymer in a specific ratio.

The dipole moment of the polar group should be more than 0.8 debye, and the content of said polar group should be within an amount of 20 to 8,000 ppm based on the total weight of the ethylene polymer or copolymer.

When the dipole moment is less than 0.8 debye, the improvement effect on the insulation resistance is insufficient.

A small amount of polar group having an increased debye value can provide a better improvement effect on the insulation resistance because the improvement effect of the polar group on said resistance increases as the value of debye of the group increases.

When the content of the polar group is less than 20 ppm, the improvement effect on the insulation resistance is insufficient, and inversely, when it is in excess of 8,000 ppm, insulation properties deteriorate.

The polar group-containing ethylene polymer or copolymer, or the composition therefrom can be not only utilized as an insulating layer used for conventional electrical wires and cables, but also as a blending material for use in synthetic resin or rubber formulations to make sheets, tapes, yarns, and as a laminated composite used in the production of insulating films, sheets, tapes, covers, and clothes.

The power cable of the present invention comprises of an insulating layer of the present polar group-containing ethylene polymer or copolymer or the composition thereof together with several conventional covering layers such as an inner semiconductive layer and/or a outer semiconductive layer, an optional outer metallic shielding layer made from copper, aluminum, lead, and an optional water-proofing layer wrapped by aluminum tapes.

The cured or uncured copolymer of the instant invention may be used as the insulation layer.

Typical examples of the curing agent include peroxides, sulfur and the like. Silane curing technique and ion radiation curing process may be employed.

In the present invention, various conventional additives or fillers may be used, in so far as they do not deviate from the gist of the present invention.

Examples of such usable additives include an antioxidant, an ultraviolet inhibitor, a pigment, a dyestuff, a lubricant, a foaming agent, a metal deactivator, a flame retardant, synthetic resins, and a rubber.

Now, the present invention will be described in detail in reference to examples.

EXAMPLES 1 TO 8 AND COMPARISON EXAMPLES 1 TO 3

The intrinsic volume resistivities and impulse breakdown strengths at 20° C. and 80° C. of the present ethylene copolymers are listed in Table 1 in comparison with the ones of an ethylene/methyl vinyl ketone copolymer having a polar group content of 10,000 ppm (Comparison Example 1), a low-density polyethylene (trade name NISSEKI Rexlon W 2000; made by Nippon Petrochemicals Co., Ltd.) (Comparison Example 2) and a conventional crosslinked polyethylene (Comparison Example 3).

INTRINSIC VOLUME RESISTIVITY AND IMPULSE BREAKDOWN STRENGTH TEST

Pressed sheet-type specimens having a thickness of 0.3 mm each were prepared from various ethylene-based polymers as shown in Table 1, and their intrinsic volume resistivities were measured after a impress of direct-current of 1,000 volts for 10 minutes.

Their impulse breakdown strengths were measured as follows:

The so-called Mckeown electrode-system having fixed electrodes therein (FIG. 1) was used. The substrate of the system was made from a polymethyl methacrylate resin (referred to as No. 4 in FIG. 1) the center of the substrate having a hole with a diameter of ½ inches therein. The electrodes consisted of two stainless steel balls (referred to as No. 1 in FIG. 1).

The specimen (about 8×10 mm) (referred to as No. 2) was placed in between the two electrodes. A deaerated epoxy resin (referred to as No. 3) was filled into the space between the specimen and the electrodes and then mer. Table 1 shows the electrical properties of the resultant graft copolymer.

EXAMPLE 11

The copolymer used in Example 3 and the low-density polyethylene W 2000 used in Comparison Example 2 were blended in a ratio of 1:4 to give the sample composition to be tested. The electrical properties of the resultant composition are set forth in Table 1.

TABLE 1

| | Type of Polymer or Copolymer | Amount of Polar Group (ppm) | MFR (g/10 min.) | Density (g/cm$^2$) | Debye | Tan$\delta$ | $\epsilon$ | Intrinsic Volume Resistivity ($\Omega \cdot$ cm) | Breakdown Strength (MV/cm) 20° C. | 80° C. |
|---|---|---|---|---|---|---|---|---|---|---|
| Example 1 | (1) | 50 | 1.0 | 0.920 | 2.9 | $1.2 \times 10^{-4}$ | 2.2 | $2.5 \times 10^{18}$ | 6.13 | 4.35 |
| Example 2 | (1) | 100 | 1.0 | 0.920 | 2.9 | $1.6 \times 10^{-4}$ | 2.2 | $4 \times 10^{18}$ | 6.16 | 4.31 |
| Example 3 | (1) | 500 | 1.0 | 0.920 | 2.9 | $3.5 \times 10^{-4}$ | 2.2 | $5 \times 10^{18}$ | 6.15 | 4.29 |
| Example 4 | (1) | 1,000 | 1.0 | 0.920 | 2.9 | $4.2 \times 10^{-4}$ | 2.2 | $5 \times 10^{18}$ | 6.18 | 4.38 |
| Example 5 | (1) | 5,000 | 1.0 | 0.920 | 2.9 | $7.9 \times 10^{-4}$ | 2.2 | $7 \times 10^{18}$ | 6.17 | 4.32 |
| Com. Example 1 | (1) | 10,000 | 1.0 | 0.920 | 2.9 | $1.3 \times 10^{-3}$ | 2.2 | $5 \times 10^{18}$ | 6.14 | 4.33 |
| Example 6 | (2) | 100 | 1.0 | 0.920 | 3.9 | $2.1 \times 10^{-4}$ | 2.2 | $4.5 \times 10^{18}$ | 6.18 | 4.40 |
| Example 7 | (3) | 100 | 1.0 | 0.920 | 3.5 | $1.9 \times 10^{-4}$ | 2.2 | $4 \times 10^{18}$ | 6.41 | 4.53 |
| Example 8 | (4) | 100 | 1.0 | 0.920 | 2.8 | $1.8 \times 10^{-4}$ | 2.2 | $4 \times 10^{18}$ | 6.15 | 4.31 |
| Example 9 | (5) | 100 | 1.0 | 0.920 | 2.8 | $1.7 \times 10^{-4}$ | 2.2 | $3 \times 10^{18}$ | 6.14 | 4.31 |
| Example 10 | (6) | 100 | 1.0 | 0.920 | 2.9 | $1.5 \times 10^{-4}$ | 2.2 | $2 \times 10^{18}$ | 6.10 | 4.28 |
| Example 11 | (7) | 100 | 1.0 | 0.920 | 2.9 | $1.6 \times 10^{-4}$ | 2.2 | $3 \times 10^{18}$ | 6.16 | 4.35 |
| Com. Example 2 | W 2000 | — | 1.0 | 0.920 | — | $9.8 \times 10^{-5}$ | 2.2 | $6 \times 10^{17}$ | 6.01 | 3.53 |
| Com. Example 3 | (8) | — | — | — | — | $2.2 \times 10^{-4}$ | 2.2 | $5 \times 10^{17}$ | 5.52 | 3.21 |

(1) Ethylene/methyl vinyl ketone copolymer
(2) Ethylene/acrylonitrile copolymer
(3) Ethylene/meta-nitrostyrene copolymer
(4) Ethylene/carbon monoxide copolymer
(5) W 2000 kneaded by Plasto-mill
(6) Ethylene-g-methyl vinyl ketone (wherein g means graft)
(7) Ethylene-b-methyl vinyl ketone (wherein b means blend)
(8) Cross-linked polyethylene cured. The Mckeown electrode-system was immersed into silicon oil contained in a vessel placed in a thermostat and the impulse breakdown strengths of the specimens were measured. The voltage waveform used was 1×40 μS negative impulse waveform which was observed by means of an oscilloscope. The average values of 20 points or more of the data, which broken down at its crest of waveform, are set forth in Table 1.

Figure 2:
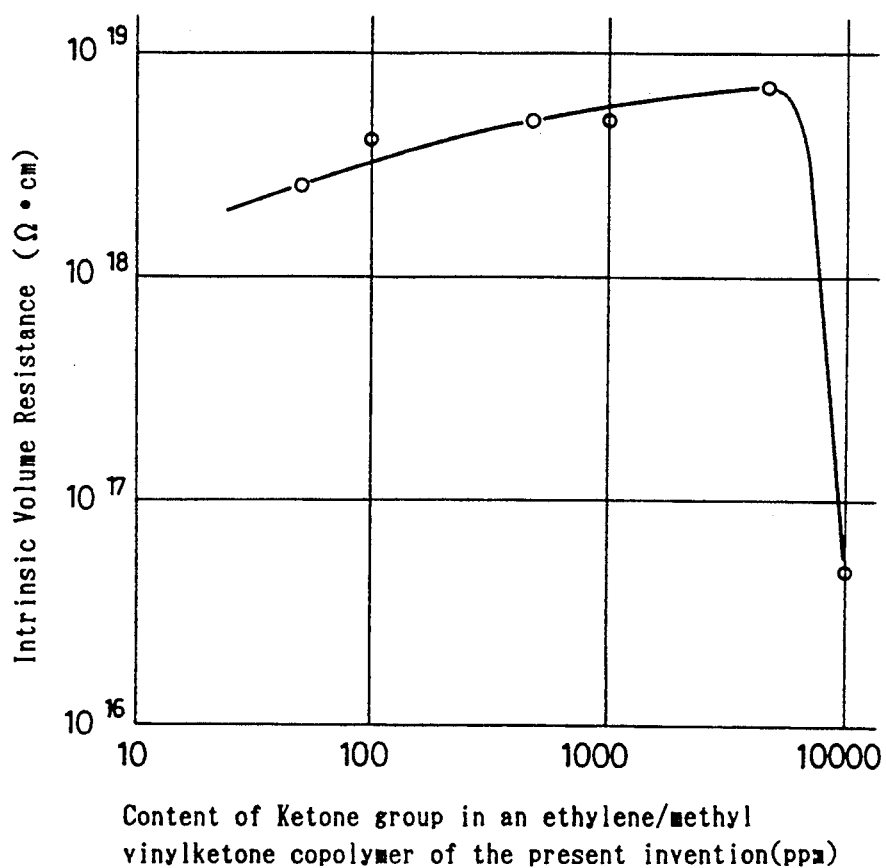
FIG. 2 shows the relationship between the content of ketone group in an ethylene/methyl vinyl ketone copolymer of the present invention and its intrinsic volume resistance.

FIG. 2 shows the relationship between the content of polar group in a polymer of the present invention and its intrinsic volume resistibility, showing an excellent improvement in said volume resistibility.

EXAMPLE 9

Low-density polyethylene (trade name Nisseki Rexlon W 2000; made by Nippon Petrochemicals Co., Ltd.) was kneaded in an atmosphere of air at 200° C. for 10 minutes by a kneeder (trade name "Labo" plasto-mill; made by Toyo Seiki Seisaku-sho Ltd.) at 40 r.p.m. thereby obtaining a carboxy group-containing low-density polyethylene. The electrical properties of the resultant polyethylene are set forth in Table 1.

EXAMPLE 10

The high pressure process low-density polyethylene (trade name NISSEKI Rexlon W 2000; made by Nippon Petrochemicals Co., Ltd.) used in Comparison Example 2 and methyl vinyl ketone were melt-kneaded in the presence of dicumylperoxide to give a graft copolymer.

In the ethylene polymer or copolymer of the present invention which contains a small quantity of a specific polar group, its insulation resistance and impulse breakdown strength are improved remarkably.

When the present power cable is employed in high voltage power transmission system, power loss may be decreased without increasing the thickness of its insulating layer.

What is claimed is:

1. In an electrical insulation material, the improvement wherein said material comprises a polar group-containing ethylene polymer or copolymer containing 20 to 8000 ppm of a polar group having a dipole moment of more than 0.8 debye and which is selected from the group consisting of nitrile and nitro groups.

2. The material according to claim 1 in which the polar group is a nitrile group.

3. The material according to claim 1 in which the polar group is a nitro group.

4. The material according to claim 1 wherein the polar group-containing ethylene polymer or copolymer composition comprises
   (1) 60 to 99.998% by weight of ethylene unit,
   (2) 0.002 to 0.8% by weight of a polar group-containing monomer unit having a dipole moment of more than 0.8 debye, and
   (3) less than 39.2% by weight of another olefinic monomer unit.

* * * * *